Sept. 5, 1939.  T. R. HARRISON  2,172,064
MEASURING AND CONTROL APPARATUS
Filed Dec. 23, 1937  2 Sheets—Sheet 1
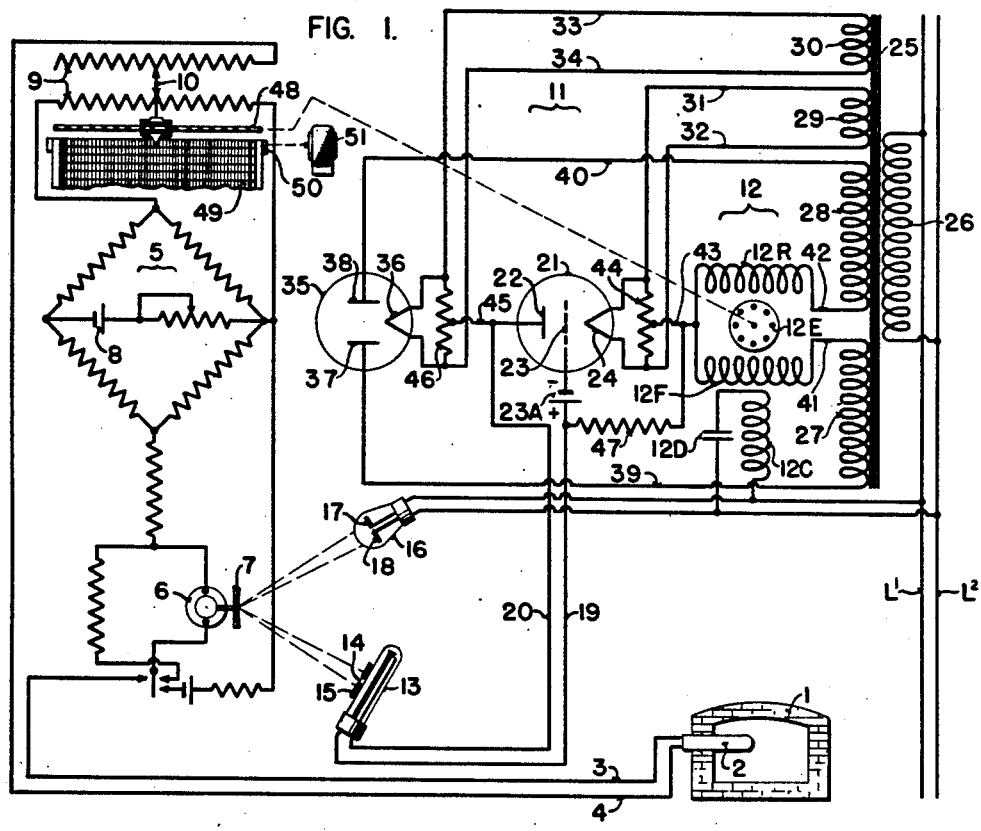
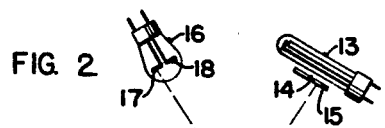
FIG. 2.
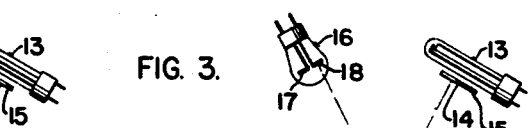
FIG. 3.
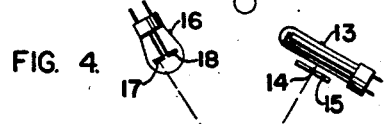
FIG. 4.
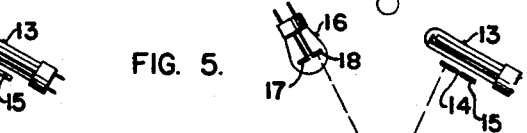
FIG. 5.
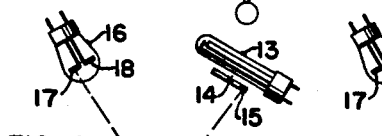
FIG. 6.
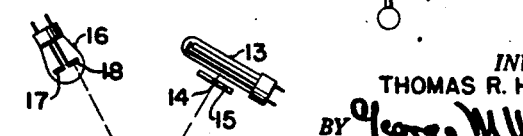
FIG. 7.
INVENTOR.
THOMAS R. HARRISON
BY George M. ——
ATTORNEYS.

Sept. 5, 1939.  T. R. HARRISON  2,172,064
MEASURING AND CONTROL APPARATUS
Filed Dec. 23, 1937  2 Sheets—Sheet 2
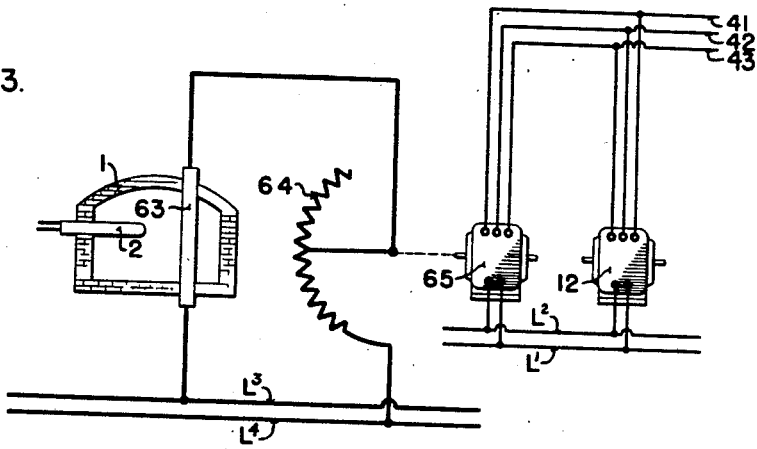
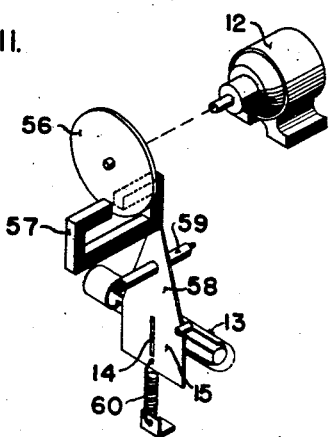
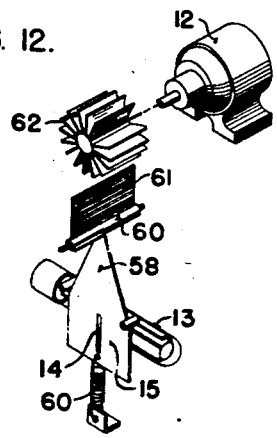
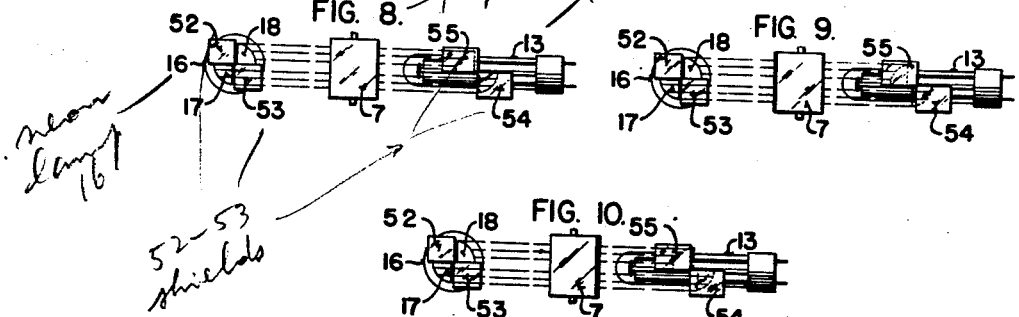
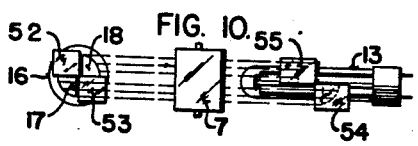
INVENTOR.
THOMAS R. HARRISON Patented Sept. 5, 1939

2,172,064

UNITED STATES PATENT OFFICE 2,172,064

MEASURING AND CONTROL APPARATUS

Thomas R. Harrison, Wyncote, Pa., assignor to The Brown Instrument Company, Philadelphia, Pa., a corporation of Pennsylvania Application December 23, 1937, Serial No. 181,309

4 Claims. (Cl. 172—239)

The present invention relates to instrumentalities useful in measuring and/or controlling a variable condition, and more particularly to electronic measuring and/or controlling apparatus adapted to produce effects in accordance with the deflection of an element which controls the apparatus and deflects in accordance with variations in a control quantity or in a quantity to be measured, and in which because of the small magnitude of the element deflecting force it is not desirable, nor possible, to have the said effects directly produced by the deflecting element.

A general object of the invention is to provide an accurate measuring and/or controlling system which is quick in its action and does not overrun or hunt and is especially adapted to produce the desired recording and/or controlling effects in response to small deflections of the most sensitive measuring instruments.

A specific object of the invention is to provide a measuring instrument in which an element deflecting in accordance with changes in the value of a quantity to be measured is included in an instrument comprising a single light sensitive cell and an electronic relay mechanism which is adapted to continuously adjust the recording pen, indicating pointer, or other exhibiting part of the instrument in accordance with the deflections of the deflecting element.

A further object of the invention is to provide an instrument of the kind referred to above in which a single light sensitive device is employed to produce an alternating current potential variable in phase and amplitude in accordance with deflections of a delicate instrument, such as a galvanometer, and which potential may be amplified and employed to continuously control the selective energization of relatively heavy apparatus.

In accordance with a preferred embodiment of the invention two sources of fluctuating light which become bright and dark in alternation, one source being bright while the other source is dark, are provided for illuminating a single light sensitive device, and the light sensitive device is selectively exposed to light from one or the other of the sources or shielded from both accordingly as a galvanometer deflects in one direction or the other from a neutral position or assumes said neutral position. Fluctuating light falling on the light sensitive device produces a pulsating electromotive force in the latter which may be readily amplified and the amplified electromotive force is employed to control the energization of a reversible electrical motor. As will be clear, the pulsating electromotive force produced in the light sensitive device when the latter is exposed to light from one of the sources mentioned will be displaced 180° in phase from that produced in the light sensitive device when the latter is exposed to light from the other source, and when the light sensitive device is shielded from both of the sources, the pulsating component of the electromotive force induced therein will be reduced to zero.

As will become apparent, I have provided a system in which a single light sensitive device is capable of controlling the selective operation of a reversible motor without the agency of relays having mechanically moving parts, and since a single light sensitive cell may be employed to produce the desired motor energizing effects, it will be clear the system is not dependent upon the individual characteristics of light sensitive cells. It is noted furthermore that, since the system is dependent upon the derivation of a pulsating electromotive force in the light sensitive cell of one phase or of the opposite phase for producing the desired motor energizing effects, changing cell characteristics will have no effect on the operation of the system.

The various features of novelty which characterize my invention are pointed out with particularity in the claims annexed to and forming a part of this specification. For a better understanding of the invention, however, its advantages and specific objects obtained with its use, reference should be had to the accompanying drawings and descriptive matter in which I have illustrated and described a preferred embodiment of the invention.

Of the drawings:

Fig. 1 is a diagrammatic view illustrating one embodiment of the invention as adapted for use in measuring and recording the temperature in a furnace;

Figs. 2–7 illustrate in detail the manner in which galvanometer deflection exposes the light responsive element of Fig. 1 to one or the other of the plates of a neon lamp or shields the element from both plates;

Figs. 8–10 illustrate in detail a modification of the arrangement illustrated in detail in Figs. 2–7;

Figs. 11 and 12 illustrate two typical damping devices which may be employed with the arrangement of Fig. 1; and Fig. 13 is a diagrammatic view illustrating the use of my invention in a control system.

In Fig. 1 of the drawings I have illustrated, more or less diagrammatically, a pyrometer for measuring and recording the temperature of the interior of a furnace 1. As illustrated, a thermocouple 2 is arranged in the interior of the furnace and the terminals of the thermocouple are connected by conductors 3 and 4 to the terminals of a null point potentiometric network 5 which may be of any suitable type such as the Brown potentiometric circuit disclosed in my prior Patent 1,898,124, issued February 21, 1933. The moving coil of a galvanometer 6, which is of the reflecting type and equipped with a mirror 7, is connected in the conductor 3. The turning of the galvanometer moving coil is desirably restricted by mechanical stops (not shown).

The potentiometric circuit 5 is of a well-known type, and it is sufficient for the present purposes to note that the potentiometric circuit includes a circuit branch including the thermocouple 2, an opposing circuit branch including a source of known potential such as a battery 8, and resistors 9, a variable portion of which may be connected into the opposed branches by means of a sliding contact 10 whereby the respective effects of the variable and known sources are made equal and opposite, and the galvanometer moving coil is thus rendered undeflected when the circuit is balanced for a given value of the E. M. F. of the thermocouple 2 with the contact 10 in a corresponding position along resistors 9. The position of contact 10 is then a measure of the value of the thermocouple E. M. F. and may then serve as a measure of the temperature to which it is exposed.

In the embodiment illustrated in Fig. 1, my invention is specifically concerned with the means by which the contact 10 is adjusted back and forth along resistors 9 in response to a galvanometer deflection, and, as shown, includes an electronic amplifier 11 and a reversible electrical motor 12, the rotation and direction of rotation of which is adapted to be selectively controlled by amplifier 11. Motor 12 is connected in any convenient manner to contact 10 for adjusting the latter along resistors 9, and as will be clear, amplifier 11 is employed for selectively controlling the motor rotation in response to a feeble pulsating voltage which is derived, in a manner to be presently explained, as a result of galvanometer deflection.

A photoelectric cell 13, which is preferably mounted in a casing (not shown) so as to be shielded from all external light except that permitted to pass through a narrow slot 14 in a shield 15 which may or may not comprise part of the casing, as desired, is connected to the input terminals of amplifier 11 and is adapted to be selectively exposed to one or the other of two beams of light which emanate from respective plates 17 and 18 of a neon lamp 16. Neon lamp 16 includes two plates 17 and 18 which are preferably positioned in the same plane and may desirably be in the form of half moons. One plate is connected to the alternating current supply conductor L¹ and the other plate is connected to the alternating current supply conductor L². Plates 17 and 18 light up in rapid alternation at a frequency corresponding to that of the alternating current supply conductors, one plate being bright while the other is dark. The light beams emanating from each plate are reflected towards photoelectric cell 13 by mirror 7 which is carried by galvanometer 6, and when the latter is deflected in one direction or the other from its neutral position, one or the other of the beams is reflected through slot 14 of shield 15 onto cell 13.

The manner in which the deflection of galvanometer 6 from its neutral position operates to derive a pulsating voltage in photoelectric cell 13 is best described in connection with Figs. 2-7. As illustrated in Figs. 2 and 3, the galvanometer mirror is indicated in its undeflected position.

In Figs. 4 and 5 mirror 7 is indicated as deflected in a counterclockwise direction from its undeflected position, and in Figs. 6 and 7, is indicated as deflected in a clockwise direction from its undeflected position.

Referring to Fig. 2, in which plate 17 is shown illuminated, it will be noted that the light beam emanating therefrom is reflected from mirror 7 onto shield 15 to the right of slot 14 so that no light impinges on photoelectric cell 13. In Fig. 3, in which plate 18 is shown illuminated, it will be noted that the light beam therefrom is reflected by mirror 7 onto shield 15 to the left of slot 14 so that in this case also no light impinges on photoelectric cell 13. Thus, when mirror 7 is in its undeflected position, photoelectric cell 13 remains dark during the alternate illumination of neon lamp plates 17 and 18 whereby the current conducted by the cell remains a steady predetermined value.

In Fig. 4, as indicated by the arrow, mirror 7 is deflected counterclockwise from its undeflected position to a position in which light emanating from neon lamp plate 17 is reflected by mirror 7 through slot 14 onto photoelectric cell 13. When plate 18 is illuminated and plate 17 is dark, however, as illustrated in Fig. 5, light is reflected from plate 18 by mirror 7 onto shield 15 at a position to the left of slot 14. Thus, when mirror 7 is in this position, light will be impinged on photoelectric cell 13 during the intervals when plate 17 is illuminated, or in other words cell 13 will be exposed to intermittent flashes of light having a frequency equal to that of the supply conductors L¹ and L².

As indicated in Fig. 7 by the arrow, mirror 7 is deflected clockwise from its undeflected position to a position in which light emanating from neon lamp plate 18 is reflected by mirror 7 through slot 14 onto photoelectric cell 13. When plate 17 is illuminated and plate 18 is dark, however, as shown in Fig. 6, light is reflected from plate 17 by mirror 7 onto shield 15 at a position to the right of slot 14. Thus, when mirror 7 is deflected clockwise from its undeflected position, photoelectric cell 13 will be exposed to intermittent flashes of light having a frequency equal to that of supply conductors L¹ and L² and it will be noted, the periods or phase of the flashes are opposite from those to which the cell is subjected when the mirror 7 is deflected in a counterclockwise direction from its undeflected position.

As will be readily apparent the emission of photoelectric cell 13 is changed in accordance with the phase of the flashes of light impinging thereon and produces across the terminals of the photoelectric cell a pulsating E. M. F. which may be readily amplified by the amplifier 11 and the amplified quantity is employed to selectively control the rotation of motor 12 to effect the desired rebalancing adjustments of contact 10 along resistors 9 and thereby restoration of the galvanometer moving coil to its normal, undeflected position.

The means for amplifying the pulsating E. M. F.'s produced across photoelectric cell 13 includes conductors 19 and 20 connecting the anode and photocathode, respectively, of cell 13 to the input terminals of an electronic valve 21. Electronic valve 21 is a filament type triode and includes an anode 22, a control grid 23 and filament cathode 24 and, as shown, conductor 20 is connected to anode 22 and conductor 19 is connected to control grid 23.

Energizing voltages are supplied amplifier 11 and photoelectric cell 13 from a transformer 25 which is a combination step-up and step-down transformer having a primary winding 26 connected between alternating supply conductors L¹ and L², and having two high voltage windings 27 and 28 and two low voltage windings 29 and 30. Low voltage secondary winding 29 supplies current through conductors 31 and 32 to the filament cathode 24 of valve 21 and low voltage secondary winding 30 supplies current through conductors 33 and 34 to the filament cathode 36 of a rectifier valve 35. Rectifier valve 35 may be, and is shown as, of standard type and includes a pair of anodes 37 and 38 in addition to the filament cathode 36. One terminal of the high voltage transformer secondary winding 27 is connected by a conductor 39 to the anode 37 and a terminal of the high voltage winding 28 of opposite polarity is connected by a conductor 40 to the anode 38. Thus, the potentials of anodes 37 and 38 will be swung alternately positively and negatively at a frequency equal to that of the supply line frequency, one anode being positive while the other is negative.

The other terminal of the high voltage winding 27 is connected by a conductor 41 to one end of a motor winding 12F and the other terminal of high voltage winding 28 is connected by a conductor 42 to one end of a motor winding 12R. Motor windings 12F and 12R are opposed windings and when selectively energized cause rotation of motor 12 in a forward and a reverse direction, respectively. The other ends of windings 12F and 12R are connected together and are connected by a conductor 43 to a center tap on a resistor 44 which is connected in shunt to the filament cathode 24 of valve 21. Anode 22 of valve 21 is connected by a conductor 45 to a center tap on a resistor 46 connected in shunt with the filament cathode 36 of rectifier valve 35.

The motor 12 may be of the well-known capacitor induction variety having a main winding 12C continuously energized from the supply conductors L¹ ond L² through a condenser 12D of suitable value, a squirrel cage rotor 12E, the opposed windings 12F and 12R, and a core (not shown), common to all the windings. The winding 12C and the opposed windings 12F and 12R are spaced in quadrature and so wound on the core that when the winding 12F is energized, a rotating field will be set up in the squirrel cage rotor 12E in one direction and when the winding 12R is energized, a rotating field will be set up in the rotor in the opposite direction thereby actuating the rotor 12E for rotation in a corresponding direction.

It is noted that full wave rectified current is supplied valve 21 due to rectifying action of valve 35, but that only half wave rectified current can pass through windings 12F and 12R of motor 12. This is brought about since valve 21 is energized during one half cycle of the supply conductor voltage by the transformer secondary winding 27, during which half cycle the motor winding 12F is energized, and during the second half cycle of the supply conductor voltage, valve 21 is energized by the secondary winding 28, during which half cycle, the motor winding 12R will be energized.

As previously noted, the anode and photocathode of photoelectric cell 13 are connected to the anode 22 and control grid 23, respectively, of valve 21, and as shown, a resistor 47 of suitable value is desirably connected between the control grid 23 and the filament cathode 24. A suitable battery 23A may be provided for supplying negative bias to the control grid 23. It will be seen that the connection of the photoelectric cell 13 and resistor 47 forms a circuit which shunts the anode 22 and cathode 24 of valve 21 whereby photoelectric cell 13 is energized from the same voltage source as valve 21.

I contemplate two modes of operation of motor 12 in the system illustrated in Fig. 1. In accordance with one method, the voltage of battery 23A is so chosen that the normal current conducted by valve 21 is an appreciable value whereby the motor windings 12F and 12R are alternately energized and motor 12 is actuated for rotation in opposite directions in rapid alternation and will remain stationary. This is the case when galvanometer 6 is in its normal, undeflected position. When the galvanometer deflects in one direction or the other from its normal position, in a counterclockwise direction, for example, photoelectric cell 13 will be exposed to the entermittent flashes of light from neon lamp plate 17 and a positive potential will be applied to control grid 23 during the half cycles when anode 37 of rectifier valve 35 is positive. As will be clear the average value of current passing through motor winding 12F will then predominate over that passing through winding 12R and accordingly motor 12 will be actuated for rotation in a forward direction. Similarly, when photoelectric cell 13 is exposed to the flashes of light originating at neon lamp plate 18, a positive potential will be applied to control grid 23 during the half cycles when anode 38 of valve 35 is positive. The average value of current passing through motor winding 12R will then predominate over that passing through motor winding 12R and motor 12 will be actuated for rotation in the reverse direction.

In accordance with the second mode of operation which I contemplate, the voltage of battery 23A is so chosen that the normal current conducted by valve 21 is a negligible value whereby the motor windings 12F and 12R will both be deenergized when the galvanometer 6 is in its undeflected position. Upon deflection of the galvanometer in one direction or the other, one or the other of windings 12F and 12R will be energized and motor 12 will be actuated for rotation in a corresponding direction.

As illustrated in Fig. 1, the shaft of motor 12 is connected in any convenient manner to a shaft 48, which may desirably be a rod having a spiral groove thereon, and the potentiometer contact 10 is mounted on a carriage carried by shaft 48 and is adapted to be moved in one direction or the other as the shaft 48 is rotated. Thus, when motor 12 is actuated for rotation as a result of galvanometer deflection, the motor effects an adjusting movement of the contact 10 along the slidewire resistors 9 in the proper direction until the potentiometer and thermocouple voltages are exactly balanced. The unbalanced current flow through galvanometer 6 will then be reduced to zero and the latter will return to its normal, undeflected position whereupon the motor will come to rest with contact 10 at a new position along resistors 9, which position will then be a measure of the temperature of the interior of furnace 1.

Desirably a pen mounted on the carriage which carries the potentiometer contact 10 is arranged to cooperate with a recorder chart 49 and to thereby provide a continuous record of the temperature of the interior of furnace 1. The recorder chart is adapted to be driven by a continuously rotating roller 50 and the latter is driven in any convenient manner, as for example, by a unidirectional motor 51 through suitable gearing (not shown), so that a record of the temperature of the interior of furnace 1 will be had as a continuous line on the chart.

In Figs. 8-10 I have illustrated in detail, more or less diagrammatically, a modification of the arrangement illustrated in detail in Figs. 2-7 for shielding photoelectric cell 13 from both plates of neon lamp 16 when the galvanometer is in its undeflected position and for selectively exposing the cell to light from one or the other of the plates when the galvanometer deflects in one direction or the other from that position. In this modification shields 52 and 53 are positioned directly in front of neon lamp 16 in such manner that diametrically opposed halves of plates 17 and 18 are shielded. Similar shields 54 and 55 are positioned directly in front of photoelectric cell 13 in such manner that the photocathode of the latter is divided into four equal rectangles, diametrically opposed rectangles being shielded by parts 54 and 55 and the remaining rectangles unshielded and arranged to be selectively exposed to the corresponding unshielded sections of neon lamp 16.

As illustrated in Fig. 8 in which mirror 7 is shown in its undeflected position, it will be seen that the quarter moons reflected by the mirror toward cell 13 from plates 17 and 18 fall upon the respective shields 54 and 55 and in this position of mirror 7, cell 13 will remain dark. In Fig. 9 mirror 7 is shown partially deflected in a counterclockwise direction, in which position it will be noted that light from plate 17 is reflected onto cell 13. The intermittent flashes of light thus directed onto cell 13 will operate to cause rotation of motor 12 in a forward direction in the manner already described in connection with Fig. 1. In Fig. 10 mirror 7 is shown partially deflected in a clockwise direction, in which position light from plate 18 is reflected onto cell 13, and it will be apparent motor 12 will then be actuated for rotation in a reverse direction.

It is noted that in this modification that the amplitude of the E. M. F. induced in photoelectric cell 13 will be proportional to the deflection of mirror 7. As shown in Fig. 9, for example, mirror 7 is only deflected slightly from its normal position, and as a result only a portion of the light from neon lamp plate 17 is directed on cell 13, but it will be apparent that upon greater deflection of mirror 7 that more of the light from plate 17 will fall on the cell. The emissivity of cell 13 will then be proportional to the deflection of mirror 7 and thereby the amplitude of the energizing current to motor winding 12F and consequently the speed of rotation of the latter will be proportional to the deflection of mirror 7.

In order that the speed of motor 12 may be as great as possible during rebalancing without overshooting of the balance point and consequent hunting taking place, means may be provided to ensure that the motor speed and the rate of change of its speed is substantially proportional to the extent of unbalance. Such means are desirable unless the motor has a suitable damping characteristic of its own and may be embodied in the devices shown in Figs. 11 and 12, for example. In Fig. 11, a disc 56, which may be of copper, is fastened to the shaft of motor 12 for rotation within a magnetic field as provided, for example, by a permanent magnet 57. Magnet 57 is carried at one end of a vane 58, and a shield 15 which may be integral with vane 58 is carried at the other end of the latter and arranged in cooperative relation with photoelectric cell 13.

Vane 58 is carried by a shaft 59 and the latter is pivoted for rotation in suitable bearings (not shown). When disc 56 is stationary and the galvanometer mirror 7 is in its undeflected position, vane 58 assumes a center position with respect to cell 13 such that shield 15 blocks all light from neon lamp 16 from the cell. If desired, a suitable spring member 60 may be provided for normally holding vane 58 in this central position.

As will be clear, upon deflection of mirror 7, light from either neon lamp plate 17 or 18 will pass through slot 14 of shield 15 and will cause motor 12 to be energized for rotation in a corresponding direction. Magnetic reaction between magnet 57 and disc 56 rotating between the poles of magnet 57 will then exert a drag on the latter which is in the proper direction to move shield 15 in the direction to intercept the light falling on cell 13.

If the potentiometric unbalance is slight and thereby the deflection of mirror 7 from its neutral position is slight, the beam will be entirely intercepted by shield 15 and motor 12 will be deenergized. The resulting decrease in motor speed will cause a corresponding reduction in the drag exerted on vane 58 by disc 56 and the vane will return toward its normal central position. If the motor rotation has not been sufficient to rebalance the potentiometric network 5, mirror 7 will still be deflected from its normal position and accordingly motor 12 will again be energized for rotation. The subsequent deflection of vane 58 from its normal central position will again operate to shield photoelectric cell 13 from neon lamp 16 and thereby to cause deenergization of motor 12. Thus, when the potentiometric network 5 is slightly unbalanced, the energizing current flow to motor 12 which is causing rotation of the latter will intermittently be cut off whereby the motor will gradually slow down and the potentiometer contact will come to rest at the exact balance point.

As will be clear, if the system is appreciably unbalanced, mirror 7 will be deflected to a greater extent and upon deflection of vane 58, the light to photoelectric cell 13 will not be cut off. It should be noted that the individual beams of light emanating from neon lamp plates 17 and 18 have a width equal to that of the plates and that they are separated by a distance preferably slightly greater than the width of slot 14. Thus, when vane 58 is in its undeflected position, the space between plates 17 and 18 will be deflected on slot 14 and the light from the plates will be reflected on shield 15. As will be apparent the maximum deflection of mirror 7 may be so adjusted with respect to the maximum deflection of vane 58 that when the mirror is deflected to its fullest extent, photoelectric cell 13 will still be exposed to light from neon lamp 16 whereby motor 12 will be continuously energized.

It will thus be clear that on an appreciable change in temperature in the interior of furnace 1, motor 12 will be continuously energized and effect rapid adjustment of potentiometer contact 10 along resistors 9 until the thermocouple E. M. F. is almost balanced, and as the balance point is approached, the energization of motor 12 will be intermittently interrupted as described hereinbefore, and the speed thereof will be reduced and contact 10 will come to rest at the exact balance point.

In Fig. 12 a vane 58 which may be similar to the correspondingly identified part of Fig. 11 is pivoted for rotation on a shaft 60 and a blade 61 integral with vane 58 is arranged in cooperative relation with a fan 62 which is carried by the shaft of motor 12. It will be clear that when motor 12 is energized for rotation, fan 62 will exert a drag on blade 61 and thereby cause deflection of vane 58 from its central position.

Although the devices illustrated in Figs. 11 and 12 for damping motor 12 have been described in connection with the arrangement shown in Fig. 1, and shown in detail in Figs. 2-7 for exposing cell 13 to one of neon lamp plates 17 or 18 upon deflection of mirror 7, it will be readily apparent that these motor damping devices may be employed with equal facility with the arrangement disclosed in Figs. 8-10.

It will be apparent that motor 12 may be employed to operate a control valve or a rheostat for governing the application of an agent to a furnace for producing heat, for example to which the thermocouple 2 is responsive, or another motor desirably operated together with motor 12 may be so employed. For example, as shown in Fig. 13, a furnace 1, to the temperature of which thermocouple 2 is responsive, is heated by a resistor 63 which is connected to electric supply conductors L³ and L⁴ through a rheostat 64, the adjustment of which is effected by a motor 65. The motor 65 may be exactly like motor 12 and is shown connected in parallel therewith. The mechanical connection of the rheostat 64 to the motor 65 is such as to decrease and increase the supply of electric current to resistor 63 as the temperature of furnace 1 rises above or drops below a predetermined level.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that certain features of my invention may sometimes be used to advantage without a corresponding use of other features.

Having now described my invention, what I claim as new and desire to secure by Letters Patent, is:

1. In combination means for deriving from an original alternating voltage source an additional alternating voltage variable in phase in accordance with the deflection of a controlling element from a predetermined position, including a light sensitive device, means under control of said controlling element to illuminate said light sensitive device with light pulsating at the frequency of said original source, and of one phase or of opposite phase accordingly as said controlling element is deflected in one direction or the other from a normal undeflected position, means under control of said light sensitive device adapted to restore the said controlling element to said undeflected position on departure therefrom, and including a shield adapted to intercept light from said illuminating means of one phase, or of opposite phase when said controlling element is deflected in one direction or the other from said undeflected position, and means to temporarily shift said shield while said controlling element is deflected to simulate restoration of said controlling element to its undeflected position and thereby arrest the operation of said restoring means.

2. In combination means for deriving from an original alternating voltage source an additional alternating voltage variable in phase in accordance with the deflection of a controlling element from a predetermined position including a light sensitive device, means under control of said controlling element to illuminate said light sensitive device with light pulsating at the frequency of said original source and of one phase or of opposite phase accordingly as said controlling element is deflected in one direction or the other from a normal undeflected position, means shielding said light sensitive device from said illuminating means when said controlling element is in a normal undeflected position, means under control of said light sensitive device adapted to restore the said controlling element to said undeflected position on departure therefrom, and means to temporarily shift said shielding means while said controlling element is deflected to simulate restoration of said element to its undeflected position and thereby arrest the operation of said restoring means.

3. In combination means for deriving from an original alternating voltage source an additional alternating voltage variable in phase in accordance with the deflection of a controlling element from a predetermined position, including at least two independent light emitting elements energized on alternating half-cycles, one of said light emitting elements being energized while the other is de-energized, a light sensitive device, means for shielding said light sensitive device from both of said light emitting elements when said controlling element is deflected in one direction or the other from said normal undeflected position, means under control of said light sensitive device adapted to restore the said controlling element to said undeflected position on departure therefrom, and means to temporarily shift said shielding means toward a position wherein the latter intercepts the light to said light sensitive cell to anticipate the return of said controlling element to said undeflected position.

4. In combination means for deriving from an original alternating voltage source an additional alternating voltage variable in phase in accordance with the deflection of a controlling element from a predetermined position, including at least two independent light emitting elements energized on alternating half-cycles, one of said light emitting elements being energized while the other is de-energized, a light sensitive device, means for shielding said light sensitive device from both of said light emitting elements when said controlling element is in a normal undeflected position but adapted to expose said light sensitive device to one or the other of said light emitting elements when said controlling element is deflected in one direction or the other from said normal undeflected position, means under control of said light sensitive device adapted to restore the said controlling element to said undeflected position on departure therefrom, and means to arrest the operation of said restoring means including a device responsive to the operation of said last-mentioned means and adapted to shift said shielding means in the direction to reduce the effect of deflection of said control element.

THOMAS R. HARRISON.